Figure 1:
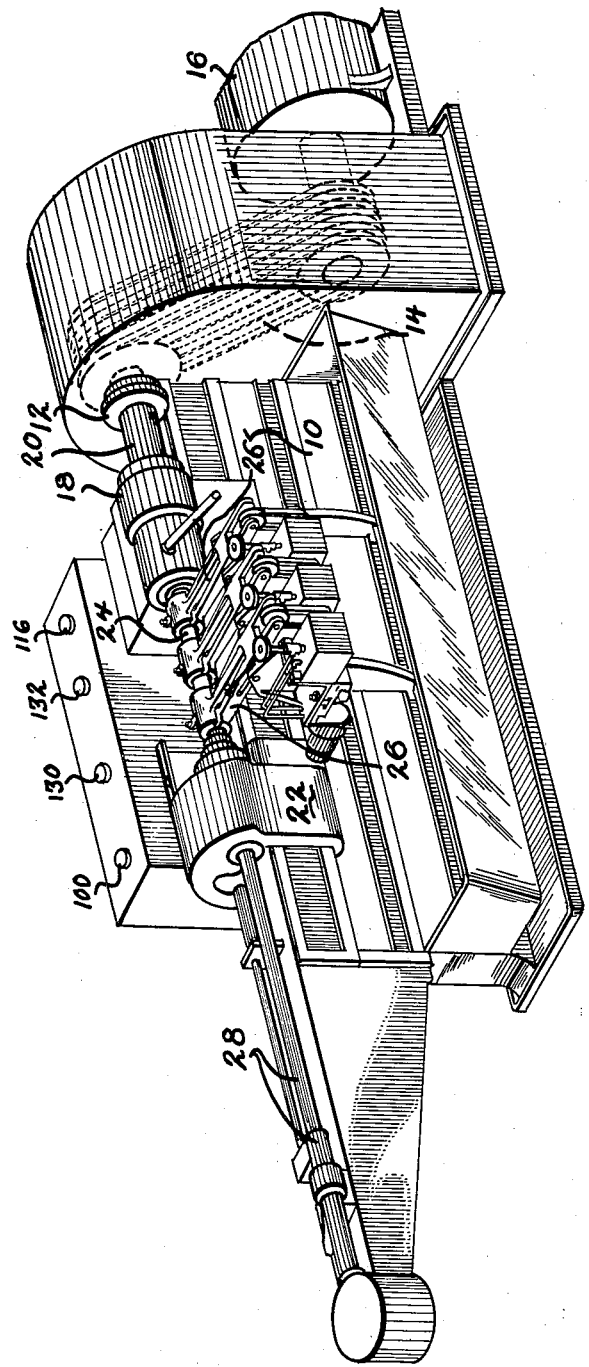

Jan. 31, 1961　　　　R. L. CARLSTEDT　　　2,969,698
CONTROL SYSTEM FOR A BORING MACHINE
Filed May 12, 1958　　　　　　　　　　　　3 Sheets-Sheet 1

INVENTOR.
RAGNAR L. CARLSTEDT
BY
ATTORNEYS

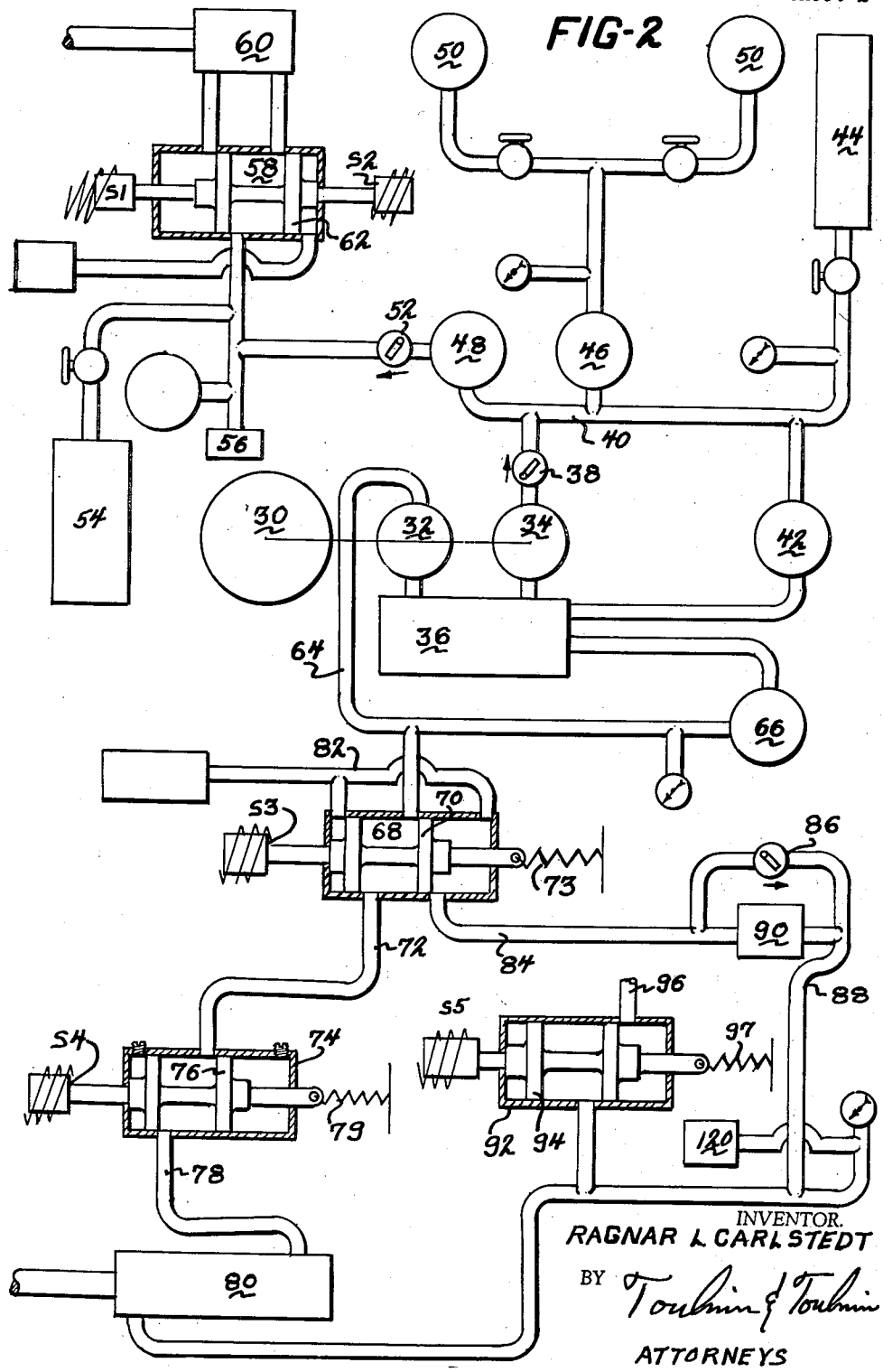

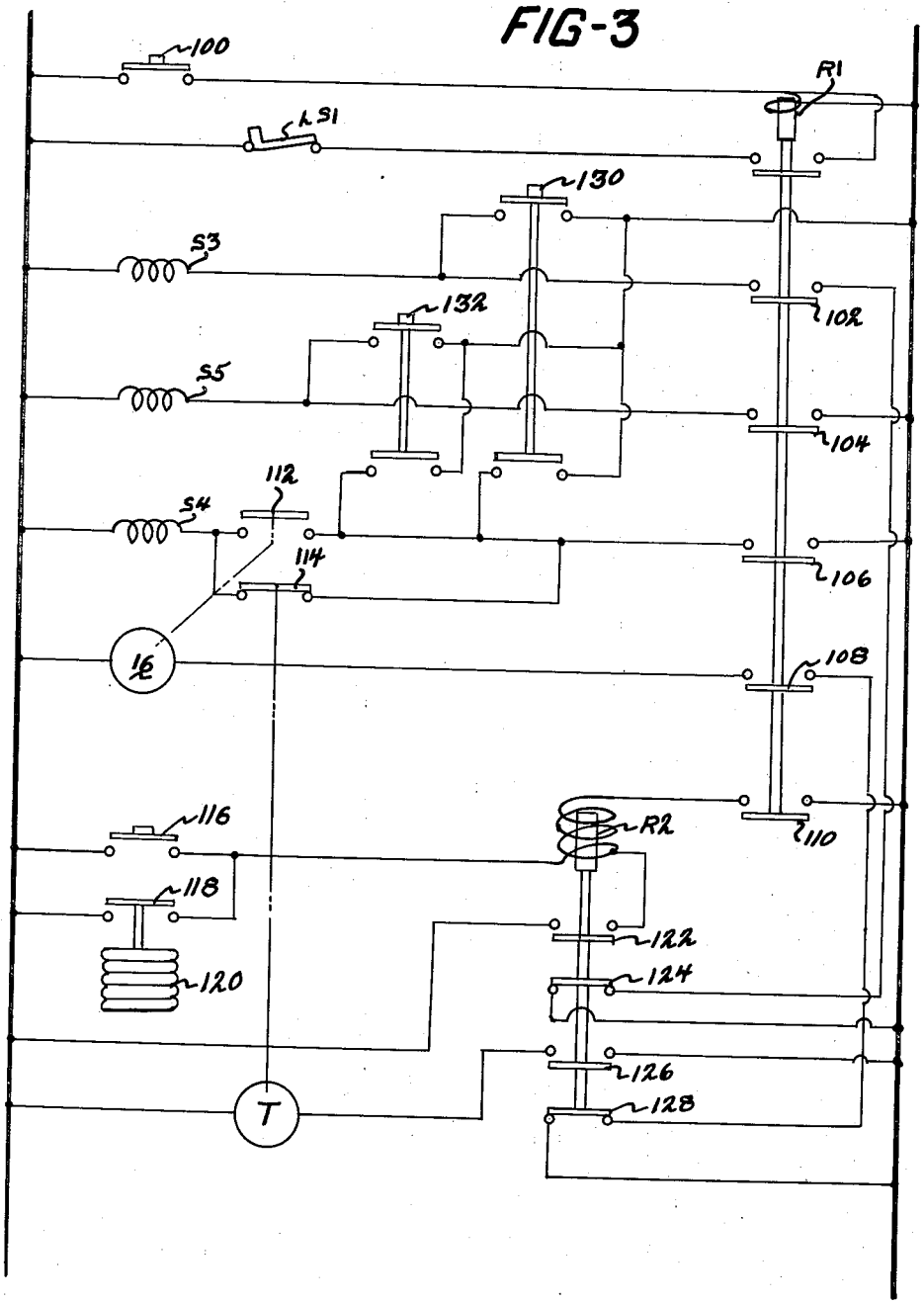

ated Jan. 31, 1961

2,969,698
CONTROL SYSTEM FOR A BORING MACHINE

Ragnar L. Carlstedt, Cincinnati, Ohio, assignor to The R. K. Le Blond Machine Tool Co., Cincinnati, Ohio Filed May 12, 1958, Ser. No. 734,616

16 Claims. (Cl. 77—3)

This invention relates to boring machines, particularly high speed boring machines for boring deep holes in elongated workpieces. More particularly still, the present invention relates to a control system for a boring machine for obtaining increased efficiency of operation.

In the boring of holes in workpieces, particularly those that are bored at high speeds, it sometimes occurs that the tool will strike a hard spot in the workpiece or become dulled to the point that excessive power is required for the boring operation or so that inferior workpieces will be produced, and under these circumstances the boring operation should be interrupted immediately.

On other occasions, it may be desired for some reason to stop the advance of the boring tool at some intermediate point in its travel, and upon such an occasion it is desirable to effect retraction of the boring tool immediately, at least a small amount, so that no further cutting takes place.

In the case of most boring operations of this nature, however, it is not desirable to effect full retraction of the boring tool upon the interruption of the boring operation since the momentum of the work piece and the parts connected therewith would cause the boring tool to cut out the bore, in some cases making it oversize and in other cases forming a spiral groove therealong.

With the foregoing in mind, it is a primary object of the present invention to provide a control system for a boring machine in which the boring operation can be interrupted either automatically or manually and the boring tool will be prevented from making a full retraction until the workpiece has stopped.

A still further object of the present invention is to provide a control system for relatively moving a boring tool and workpiece in the feed direction so arranged that interruption of the said relative feeding movement is accompanied by an instantaneous short retraction of the boring tool to space it from the bottom of the hole being bored.

Another object of this invention is the provision of a hydraulic control circuit for controlling the relative reciprocation of a boring bar and a workpiece being bored thereby in which the hydraulic fluid is bypassed when the machine is idle thus preventing overheating of the oil and loss of power.

These and other objects and advantages will become more apparent upon reference to the accompanying drawings, in which:

Figure 1 is a perspective view of a boring machine having the present invention incorporated therein, Figure 2 is a diagrammatic representation of a preferred form of the hydraulic circuit by means of which the machine is operated, and Figure 3 is a diagrammatic representation of one form which the electric control system can take and which control system controls the operation of the valves of the hydraulic circuit of Figure 2 and the energization of the spindle motor of the boring machine.

Referring to the drawings more in detail, the boring machine which is illustrated in Figure 1 comprises a bed 10 and at one end thereof is a rotatable spindle 12 driven via the pulley and belt arrangement 14 by a spindle motor 16.

The bed 10 has mounted thereon a clamp unit 18 that comprises a hydraulic motor so that the clamp can be moved into pressure engagement with one end of a workpiece 20, the other end of which is engaged by the spindle whereby the workpiece will rotate with the spindle. The bed also supports a boring slide 22 and carried by the boring slide is an elongated tubular boring tool 24 that extends through the clamp so as to be engageable with the end of the workpiece 20 whereby the workpiece will be bored as it rotates. The boring slide comprises a hydraulic actuating ram for reciprocating it along bed 10.

Arranged between clamp 18 and boring slide 22 are a plurality of sets of steady rest arms 26 which can be closed about the boring bar to support it against deflection and vibration during a boring operation and which can be opened as the boring slide advances to permit the boring slide to pass by the steady rests.

High pressure cooling and lubricating fluid is supplied to the workpiece through the clamp along the outside of the boring tool and this fluid, together with the chips taken by the boring tool, return backwardly through the tubular boring tool and the telescoping piping 28 to a filter where the chips are separated from the fluid so that the fluid can be reused.

The hydraulic circuit by which the boring machine is operated is illustrated in Figure 2 wherein it will be seen that there is a motor 30 driving a first pump 32 and a second pump 34. The pumps are connected for drawing fluid from a reservoir 36 and pump 34 discharges this fluid through a check valve 38 to a conduit 40 that is connected through relief valve 42 to tank 36 and which is also connected to an accumulator 44 and to the inlets of pressure reducing valves 46 and 48.

The outlet side of pressure reducing valve 46 is connected with the motors 50 that operate the steady rest arms previously referred to with valves (not shown) being provided for operating the motors to open and close the arms as the boring slide reciprocates.

The discharge side of pressure reducing valve 48 is connected through check valve 52 with a conduit that leads to an accumulator 54, to a pressure switch 56, and to the pressure inlet of a four-way reversing valve 58 which has its service ports connected to the opposite ends of the hydraulic motor 60 for operating the clamp 18.

Solenoids S1 and S2 pertaining to the valve 58 are operable for shifting the valve member 62 into its opposite end positions for reversibly controlling the supply of fluid to the clamp motor. The pressure switch 56 serves for causing an indicating light to be illuminated whenever the pressure available for operating the clamp motor is below a predetermined desired value. The pressure accumulators 44 and 54 serve to retain sufficient fluid under pressure to operate the steady rest motors 50 and the clamp motor 60 in event of failure of the pump 34 so that the machine can readily be unloaded in this circumstance.

The other pump 32 that is driven by motor 30 discharges to conduit 64 to which is connected a pressure relief valve 66 that discharges back to tank 36 and with conduit 64 also leading to the pressure inlet of a four-way reversing valve 68. Valve 68 has a valve member 70 urged toward the right by tension spring 73 and adapted for being moved toward the left by energization of solenoid S3. When solenoid S3 is energized conduit 64 is connected to conduit 72 leading to one port of a valve 74. Valve 74 has a valve member 76 urged toward the right by a tension spring 79 adapted for being moved to the left by energization of a solenoid S4.

When valve member 76 is in its lefthand position conduit 72 is connected with conduit 78 leading to the advancing side of the fluid motor 80 pertaining to the boring slide 22. When solenoid S4 is deenergized valve member 76 moves to the right and conduit 78 is blocked.

Returning to valve 68, when solenoid S3 is deenergized and valve member 70 moves to the right, conduit 72 will be connected with the exhaust conduit 82 while the connection between the said exhaust conduit and a conduit 84 will be interrupted and instead the conduit 84 will be connected with pressure conduit 64. Conduit 84 leads through the rightwardly opening check valve 86 to a conduit 88 with the check valve being bypassed by a restrictor 90. Conduit 88 leads to the retraction side of the boring slide fluid motor 80 and also to one port of a valve 92 that has therein a valve member 94 urged rightwardly by a tension spring 97 and adapted for being moved toward the left by energization of a solenoid S5. When solenoid S5 is deenergized conduit 88 is connected with exhaust conduit 96 whereas when solenoid S5 is energized conduit 88 is blocked off.

The electrical circuit by which the solenoids referred to above are controlled is illustrated in Figure 3 except for the valve solenoids S1 and S2 which are preferably manually controlled except when an automatic loader is used, in which case the solenoids would be under the control of the loading mechanism and the boring slide.

What is shown in Figure 3 is an arrangement for controlling solenoids S3, S4, and S5, and the energization of spindle motor 16 to obtain the objectives of the present invention. In Figure 3 there is a first relay R1 adapted for being energized by closing of a manual switch 100 and having a holding circuit through a limit switch LS1 that is normally closed but which is adapted for being opened by the boring slide 22 when fully retracted.

Relay R1 has a blade 102 in circuit with solenoid S3, blade 104 in circuit with solenoid S5, and blade 106 in circuit with solenoid S4, so that upon energizing of relay R1 all of the solenoids will ordinarily become energized thus placing the system in feed with the boring slide advancing at feed rate.

Relay R1 also has a blade 108 in circuit with spindle motor 16 so that the spindle motor will start upon energization of the said relay.

A still further blade 110 is in circuit with the energizing coil of relay R2 so that relay R2 can only be energized when relay R1 is closed and so that opening of relay R1 by actuation of limit switch LS1 will also open relay R2.

In the circuit to solenoid S4 is a normally open switch 112 mechanically associated with the spindle motor so that whenever the spindle motor is rotating switch 112 is opened but the said switch will close when the spindle motor comes to a halt.

In parallel with the switch blade 112 is a switch blade 114 that is normally closed but which is adapted for being opened a predetermined time after the energization of a timer motor T and to remain open during the period that the timer is energized, again closing upon deenergization of the timer.

Relay R2 is adapted for being energized upon closing of a manual stop switch 116 or upon closing of a switch 118 that has a pressure sensitive actuator 120 connected in circuit with the retraction side of boring slide motor 80 as illustrated in Figure 2.

Energization of relay R2 is accomplished by closing of manual stop switch 116 or by closing of switch blade 118, the former occurring when the switch is closed manually and the latter occurring when the boring slide slows down either due to the tool becoming dulled or there being a hard spot in the work, or from the boring slide coming to rest against a stop when the work operation is completed.

Energization of R2 will establish a holding circuit through blade 122 thereof and will open blade 124 that is in the circuit of solenoid S3 thereby to deenergize the solenoid, and there will be closed a blade 126 to cause energization of the timer T.

Deenergization of solenoid S3 places the boring slide into rapid retraction and the boring slide will commence to move backward. However, a very short time after timer T is energized blade 114 thereof will be opened and this will cause deenergization of solenoid S4 thereby preventing discharge of fluid from motor 80 and locking it in position. The boring slide will thus halt and will remain in a halted position until switch blade 112 closes indicating that spindle motor has come to a halt.

The spindle motor will halt because the blade 128 of relay R2 opens the circuit to the spindle motor when R2 is energized thereby deenergizing the motor and permitting it to slow down to a stop.

After switch blade 112 closes and energizes solenoid S4, the retraction of the boring slide again commences and it continues to its rearmost position, at which time LS1 is opened deenergizing both relays R1 and R2 and, in turn, deenergizing solenoids S3, S4, and S5, so that the boring machine slide comes to a halt. At this time, also, valve member 94 of valve 92 shifts rightwardly and bypasses pump 32 directly to the tank thus entirely unloading the hydraulic circuit.

In case it is wished to reciprocate the boring slide for purposes of setup or the like, there may be provided a manual switch 130 which, when closed, will cause energization of solenoids S3 and S4 thus to place the boring slide on rapid advance. Opening of this switch will halt the boring slide in whatever position it occupies.

For rapid retraction of the boring slide, second switch 132 is provided which, when closed, causes energization of solenoids S4 and S5 thereby to place the boring slide in rapid retraction. The two switches 130 and 132 thus provide manual means for reciprocating and positioning the boring slide independently of the control system.

The described arrangement provides for full control of the boring machine and in particular provides for automatic retraction of the boring slide upon slowing down thereof due to a dull tool or a hard spot in the work, and provides for the full retraction of the boring slide to be prevented until the spindle motor comes to a halt with the boring slide, instead, jumping back a short distance, say, an eighth to a quarter of an inch at the instant of stopping and then resuming its retracting movement after the spindle motor has halted. The particular amount of retraction of the boring slide is merely exemplary, and it could be arranged to retract a greater or lesser distance, if so desired.

It will be understood that this invention is susceptible to modification in order to adapt it to different usages and conditions, and accordingly, it is desired to comprehend such modifications within this invention as may fall within the scope of the appended claims.

I claim:

1. In a boring machine; a boring slide adapted for supporting a boring tool, means for supporting a workpiece to be bored by the tool, a first motor energizable for causing relative rotation of the workpiece and boring tool, a second motor energizable in the forward direction to cause relative feed movement between the boring slide and workpiece along a predetermined axis to carry out a boring operation and energizable in the reverse direction to cause relative retracting movement between the boring slide and workpiece along the same axis, means for deenergizing said first motor to interrupt a boring operation, means operable automatically for momentarily reversing said second motor simultaneously with the said deenergization of said first motor to cause the boring tool and workpiece to retract relatively slightly and for then de-energizing said second motor, and means operable automatically in response to the halting of said first motor for again energizing said second motor in the reverse direction to cause the relative retracting movement of the boring slide and workpiece to be resumed.

2. In a boring machine; a rotary spindle and a first motor energizable to drive the spindle, an axially movable boring slide and a second motor reversibly energizable to cause feed and retraction movement, respectively, of the slide, means for energizing said motors to cause a boring operation to take place, means for deenergizing said first motor while simultaneously momentarily reversing said second motor to interrupt the boring operation while slightly retracting the boring slide and for then de-energizing said second motor, and means responsive to halting of the said first motor and spindle for again energizing said second motor in the reverse direction to resume the retracting movement of the boring slide in the absence of rotation of said spindle.

3. In a boring machine; a rotary spindle, an electric motor energizable for driving the spindle, a boring slide movable axially of the spindle, a reversible fluid motor connected with the slide for reciprocating the slide relative to the spindle, means for energizing the electric motor and for supplying fluid to the advancing side of the fluid motor to carry out a boring operation, means for deenergizing said motors to interrupt the boring operation and for momentarily supplying fluid to the reverse side of the fluid motor whereby the boring slide jumps back from the workpiece a slight distance, and means responsive to the halting of the spindle and its drive motor for again initiating a supply of fluid to the retraction side of said fluid motor thereby to complete the retraction movement of the boring slide.

4. In a boring machine; a rotary spindle and an electric drive motor therefor, a boring slide adapted for supporting a boring tool to bore a workpiece rotated by the spindle, a reversible fluid motor connected with the boring slide for reciprocating it relative to the spindle, means for energizing the spindle motor and for supplying fluid to the advancing side of said fluid motor to carry out a boring operation, means for deenergizing the spindle motor while simultaneously momentarily reversing the supply of fluid to said fluid motor to interrupt the boring operation and simultaneously slightly retracting the boring slide, and means responsive to halting of the spindle and its motor for resuming the supply of fluid to said fluid motor in the reverse direction to complete the retracting movement of said boring slide in the absence of rotation of the spindle.

5. In a boring machine; a rotary spindle, an electric motor for driving the spindle, a boring slide, a reversible fluid motor connected with the boring slide, means for energizing the electric motor and for supplying fluid to the advancing side of the fluid motor while restricting the discharge of fluid from the retraction side thereof to carry out a boring operation, means for deenergizing said electric motor and for connecting the advancing side of said fluid motor with exhaust while supplying pressure fluid directly to the retraction side of said fluid motor to cause interruption of the boring operation and initiation of retraction of the boring slide, means operable to interrupt the discharge of fluid from the advancing side of said fluid motor immediately after initiation of the retracting movement to halt said retracting movement, and means responsive to the halting of said spindle for again connecting the said advancing side of the fluid motor with exhaust whereby the boring slide completes its retracting movement in the absence of rotation of the spindle.

6. In a boring machine; a rotary spindle, an electric motor for driving the spindle, a boring slide, a reversible fluid motor connected with the boring slide, means for energizing the electric motor and for supplying fluid to the advancing side of the fluid motor while restricting the discharge of fluid from the retraction side thereof to carry out a boring operation, means for deenergizing said electric motor and for connecting the advancing side of said fluid motor with exhaust while supplying pressure fluid directly to the retraction side of said fluid motor to cause interruption of the boring operation and initiation of retraction of the boring slide, means operable to interrupt the discharge of fluid from the advancing side of said fluid motor immediately after initiation of the retracting movement to halt said retracting movement, and means responsive to the halting of said spindle for again connecting the said advancing side of the fluid motor with exhaust whereby the boring slide completes its retracting movement in the absence of rotation of the spindle, there being means operable upon completion of the retracting movement of the boring slide for connecting the retracting side of said fluid motor with exhaust thereby to bypass the supply of fluid directly to exhaust.

7. In a boring machine; a rotary spindle and a first motor to drive the spindle, a boring slide and a reversible fluid motor connected with the slide, a source of fluid under pressure, a first valve to which the source discharges, first and second conduits leading from said valve, said valve having a first position where the source is connected to the first conduit and the second conduit is connected to exhaust and a second position where the said connections are reversed, a second valve connected to the first conduit and having a first position where the first conduit is connected with the advancing side of said fluid motor and a second position where the connection is interrupted, said second conduit being connected with the retracting side of said fluid motor via a check valve opening toward the motor, a restrictor bypassing said check valve, a third valve connected with the downstream side of the check valve and having a first closed position and a second position where the downstream side of the check valve is connected with exhaust, first control means operable to move said first, second, and third valves into their said first positions and for energizing said spindle motor to initiate a boring operation, second control means operable for moving said first valve to its second position and deenergizing said spindle motor to interrupt said boring operation while simultaneously initiating retraction of the boring slide, third control means operable for moving said second valve to its second position immediately after the retracting movement commences to halt the said retracting movement, and fourth control means responsive to the halting of said spindle for moving said second valve back to its first position to complete the retracting movement of the boring slide.

8. A boring machine and control system therefor according to claim 7 in which the said first control means comprises a relay energizable for effecting the simultaneous movement of the said first, second, and third valves into their said first positions.

9. A boring machine and control system therefor according to claim 8 in which the said second control means comprises a relay operable for interrupting the energizing circuit to the spindle motor and for moving the first valve to its second position when energized, and there being switch means including a pressure switch adapted for closing in response to a predetermined low pressure on the retracting side of said fluid motor for causing energization of the relay.

10. A boring machine and control system therefor according to claim 7 in which the said first, second, and third valves are spring biased toward their said second positions and have solenoids associated therewith energizable for moving them to their said first positions.

11. A boring machine and control system therefor according to claim 10 in which the first control means comprises a relay energizable for completing energizing circuits to all said solenoids, said second control means comprises a relay energizable for interrupting the energizing circuit to the solenoid of the said first valve and to said spindle motor, and the said third control means comprises a timer energizable by closing of said second relay and including a blade in the energizing circuit to the solenoid of said second valve, said blade being adapted for being opened by the timer a predetermined time after the timer is energized and for remaining open as long as the timer remains energized.

12. A boring machine and control system therefor according to claim 11 in which the said fourth control means comprises a switch blade bypassing the said timer controlled switch blade adapted for closing only when the spindle comes to a halt.

13. A boring machine and control system therefor according to claim 7 in which there is means controlled by the boring slide for causing movement of said first, second, and third valves into their said second positions when the boring slide is fully retracted whereby the said fluid source is bypassed to exhaust.

14. In a boring machine; a spindle and a first motor connected thereto, a boring slide, a reversible fluid motor connected with the slide, a pump, first and second conduits, a first valve connecting the pump to the conduits, a solenoid energizable to move the first valve to a first position in which the pump is connected with the first conduit and the second conduit is connected with exhaust and a spring to move the first valve to a second position in which said connections are reversed, a second valve between the first conduit and the advancing side of the fluid motor, a solenoid energizable for moving the second valve to a first position where the first conduit is connected with the fluid motor and a spring to move the second valve to a second position where the connection is interrupted, said second conduit leading to the retracting side of said fluid motor via a check valve, a restrictor bypassing said check valve, a third valve connected between the retracting side of the fluid motor and exhaust, a solenoid energizable for moving said third valve to a first position where it is closed and a spring to move the third valve to a second position where it is open, a start switch closable for energizing all of said solenoids and for energizing the spindle motor, a pressure switch sensitive to a predetermined reduced pressure in said retracting means operable for deenergizing the solenoid of the first valve and said spindle motor, a timer energized by closing of said pressure switch operable for deenergizing the solenoid of said second valve after a predetermined time interval, and a speed sensitive switch operated by the spindle responsive to the halting of the spindle for again energizing the solenoid of said second valve.

15. A boring machine and control system therefor according to claim 14 in which there is a switch operated by the boring slide at the completion of its retracting movement for deenergizing all of the solenoids of said first, second, and third valves.

16. A boring machine and control system therefor according to claim 14 in which means are provided for selectively energizing the solenoids of said first and second valves for obtaining rapid advance of said boring slide and other means selectively operable for selectively energizing the solenoids of said second and third valves for obtaining rapid retraction of the boring slide.

References Cited in the file of this patent

UNITED STATES PATENTS

| | | |
|---|---|---|
| 2,073,518 | Hirvonen | Mar. 9, 1937 |
| 2,146,446 | Schmidt | Feb. 7, 1939 |
| 2,181,055 | Hirvonen | Nov. 21, 1939 |
| 2,286,074 | Egger | June 9, 1942 |
| 2,893,273 | Berthiez | July 7, 1959 |